(12) United States Patent
Daandels et al.

(10) Patent No.: US 12,049,314 B2
(45) Date of Patent: Jul. 30, 2024

(54) MAIN WING FOR AN AIRCRAFT WITH ELASTICALLY DEFORMABLE UPPER SKIN PANEL

(71) Applicant: Airbus Operations GmbH, Hamburg (DE)

(72) Inventors: Dort Daandels, Hamburg (DE); Bernhard Schlipf, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 17/699,312

(22) Filed: Mar. 21, 2022

(65) Prior Publication Data
US 2022/0306278 A1    Sep. 29, 2022

(30) Foreign Application Priority Data
Mar. 23, 2021    (DE) .......................... 102021107277.8

(51) Int. Cl.
*B64C 9/24* (2006.01)
*B64C 9/02* (2006.01)
*B64C 13/30* (2006.01)

(52) U.S. Cl.
CPC .................. *B64C 9/24* (2013.01); *B64C 9/02* (2013.01); *B64C 13/30* (2013.01)

(58) Field of Classification Search
CPC .... B64C 9/02; B64C 9/24; B64C 9/16; B64C 9/18; B64C 9/22
See application file for complete search history.

(56) References Cited

U.S. PATENT DOCUMENTS

| 4,200,253 A | 4/1980 | Rowarth |
| 4,252,287 A * | 2/1981 | Zimmer .................... B64C 3/48 244/214 |

(Continued)

FOREIGN PATENT DOCUMENTS

| DE | 102011001582 A1 | 10/2012 |
| DE | 102011018906 A1 | 10/2012 |

(Continued)

OTHER PUBLICATIONS

Vasista et al., Morphing Wing Droop Nose with Large Deformation Ground Tests and Lessons Learned, Oct. 2, 2019, Aerospace 2019. 6.111 (Year: 2019).*

(Continued)

*Primary Examiner* — Brady W Frazier
*Assistant Examiner* — Shanna Danielle Glover
(74) *Attorney, Agent, or Firm* — Greer, Burns & Crain, Ltd.

(57) ABSTRACT

An aircraft wing, including a main wing, a leading edge high lift assembly including a high lift body, and an assembly connecting the high lift body to the main wing. The high lift body is movable relative to the main wing between stowed and deployed positions. The connection assembly includes at least one rotation element mounted to the high lift body and rotatably mounted to the main wing. The main wing comprises an upper panel with a leading edge portion and a lower skin panel. The high lift body has a leading and a trailing edge. The high lift body trailing edge moves along the main wing upper skin panel leading edge portion when the high lift body is moved between the stowed and deployed positions. The upper skin panel leading edge portion is elastically deformed when the high lift body is moved from the stowed to the deployed position.

17 Claims, 5 Drawing Sheets

(56) References Cited

U.S. PATENT DOCUMENTS

| | | | |
|---|---|---|---|
| 4,285,482 A | | 8/1981 | Lewis |
| 4,553,722 A | * | 11/1985 | Cole .......................... B64C 3/48 |
| | | | 244/214 |
| 5,158,252 A | * | 10/1992 | Sakurai ..................... B64C 3/48 |
| | | | 244/214 |
| 5,388,788 A | | 2/1995 | Rudolph |
| 9,598,167 B2 | * | 3/2017 | Grip .......................... B64C 3/26 |
| 9,656,739 B2 | | 5/2017 | Hue et al. |
| 2014/0246540 A1 | | 9/2014 | Schlipf et al. |
| 2015/0353187 A1 | | 12/2015 | Smith |
| 2021/0001972 A1 | | 1/2021 | Mangione et al. |
| 2021/0024198 A1 | | 1/2021 | Lorenz et al. |

FOREIGN PATENT DOCUMENTS

| | | |
|---|---|---|
| DE | 102015103601 A1 | 9/2016 |
| EP | 2939921 A1 | 11/2015 |

OTHER PUBLICATIONS

German Search Report; priority document.
European Search Report for corresponding European Patent Application No. 22160772 dated Jul. 27, 2022.

* cited by examiner

MAIN WING FOR AN AIRCRAFT WITH ELASTICALLY DEFORMABLE UPPER SKIN PANEL

CROSS-REFERENCES TO RELATED APPLICATIONS

This application claims the benefit of the German patent application No. 102021107277.8 filed on Mar. 23, 2021, the entire disclosures of which are incorporated herein by way of reference.

FIELD OF THE INVENTION

The present invention relates to a wing for an aircraft. Further aspects of the invention relate to a leading edge high lift assembly for such a wing as well as an aircraft comprising such a leading edge high lift assembly and/or such a wing.

BACKGROUND OF THE INVENTION

The wing comprises a main wing and a leading edge high lift assembly movable relative to the main wing to increase lift of the wing. The leading edge high lift assembly comprises a high lift body and a connection assembly. The high lift body is preferably a droop high lift body referred to as droop nose, droop leading edge, droop flap or slat, in particular sealed slat. The connection assembly is configured for connecting the high lift body to the main wing, in particular to the leading edge of the main wing, in such a way that the high lift body is movable relative to the main wing between a stowed position and a deployed position. The stowed position relates to a position where the wing profile has a lower curvature and might also be referred to as straight position, normal position, cruise position or retracted position, while the deployed position relates to a position where the wing profile has a higher curvature and might also be referred to as drooped position, landing position or extended position.

The connection assembly comprises at least one rotation element, such as a rotation rod or a part of the high lift body structure, that is mounted to the high lift body and that is mounted to the main wing rotatably about an axis of rotation. The rotation element is mounted to the high lift body directly or indirectly and in a fixed or rotatable manner, preferably in a fixed, non-rotatable manner, e.g., by a hinge between the end of the rotation element and the high lift body and additionally by a fixing link that is hinged to the rotation element and that is hinged to the high lift body spaced apart from the rotation element, so that a relative rotation of the high lift body and the rotation element is prevented. The axis of rotation is preferably arranged at a lower part of the main wing near or at a lower skin and preferably extends in parallel to the span direction and/or in parallel to the extension of leading edge along the wing, so that the high lift body is preferably rotated about the axis of rotation when moved between the stowed position and the deployed position.

The main wing comprises an upper skin panel for contact with an ambient flow on an upper side of the main wing, and a lower skin panel for contact with an ambient flow on a lower side of the main wing. The upper skin panel has a leading edge portion in the area of a leading edge of the main wing and facing the high lift body. The upper skin panel and the lower skin panel might be joined at the leading edge of the main wing, or might have an open end at the leading edge of the main wing, where they might be connected or supported against each other via a front spar.

The high lift body extends between a leading edge and a trailing edge, the trailing edge preferably in parallel to the axis of rotation. The trailing edge of the high lift body is configured to move, preferably slide, along the outer surface of the leading edge portion of the upper skin panel of the main wing, preferably in contact with the outer surface of the leading edge portion of the upper skin panel, when the high lift body is moved between the stowed position and the deployed position. The contact might generally seal the high lift body to the upper skin panel for essential flow, but it might also be formed such that a leakage flow is permitted. It is also possible that the trailing edge of the high lift body moves along the outer surface of the leading edge portion of the upper skin panel of the main wing out of contact with the outer surface of the leading edge portion of the upper skin panel, when the high lift body is moved between the stowed position and the deployed position, so that a defined gap is formed between the trailing edge of the high lift body and the outer surface of the leading edge portion of the upper skin panel during movement of the high lift body, thereby allowing a defined leakage flow or even essential flow through the gap.

Similar wings are known in the art. By increasing the curvature of the wing profile when the high lift body is moved to the deployed position, lift of the related aircraft can be increased, in particular to allow approach and landing with lower speed and on shorter runways. High lift assemblies with a drooping, downward rotating high lift body that is sealed to the leading edge portion of the upper skin panel, such as droop nose assemblies, related to simple and effective high lift devices. However, some known devices cause a pressure peak in the area of the transition between the trailing edge of the high lift body and the leading edge portion of the upper skin panel.

SUMMARY OF THE INVENTION

Therefore, an object of the present invention is to provide a wing causing a smooth pressure profile along its upper skin panel.

This object is achieved in that the leading edge portion of the upper skin panel is configured to be elastically deformed, in particular bent towards the lower skin panel, when the high lift body is moved from the stowed position to the deployed position. In such a way, a smooth transition from the trailing edge of the high lift body to the upper skin panel can be achieved avoiding small and discontinuous curvature radii. This results in a smooth pressure profile along the upper skin panel without undesired pressure peaks.

According to a preferred embodiment, the leading edge portion of the upper skin panel is configured to be elastically deformed, when the high lift body is moved from the stowed position to the deployed position, by at least one link element that is mounted, preferably rotatably mounted, preferably at one end, to the rotation element and that is, preferably at the other end, mounted to, preferably rotatably mounted to, the leading edge portion of the upper skin panel. When the rotation element rotates downwards to move the high lift body into the deployed position, the link element mounted to the rotation element pulls the leading edge portion of the upper skin panel downwards, too. When the rotation element rotates upwards to move the high lift body back into the stowed position, the link element pushes the leading edge portion of the upper skin panel back upwards into the undeformed state. By such a link element the curvature of the leading edge portion of the upper skin panel can be precisely adapted to form the desired pressure profile.

Additionally or alternatively, it is preferred that the leading edge portion of the upper skin panel is configured to be elastically deformed, when the high lift body is moved from the stowed position to the deployed position, by at least one rope element that is attached, preferably at one end, to the rotation element and that is, preferably at the other end, attached to the leading edge portion of the upper skin panel. When the rotation element rotates downwards to move the high lift body into the deployed position, the rope element attached to the rotation element pulls the leading edge portion of the upper skin panel downwards, too. When the rotation element rotates upwards to move the high lift body back into the stowed position, the elastic properties of the upper skin panel move the leading edge portion of the upper skin panel back upwards into the undeformed state. By such a rope element the curvature of the leading edge portion of the upper skin panel can be precisely adapted to form the desired pressure profile.

Additionally or alternatively, it is preferred that the leading edge portion of the upper skin panel is configured to be elastically deformed by the trailing edge of the high lift body moving along and contacting, preferably sliding over and continuously contacting, preferably pressing onto, an outer surface of the leading edge portion of the upper skin panel, when the high lift body is moved from the stowed position to the deployed position. When the rotation element rotates downwards to move the high lift body into the deployed position, the trailing edge of the high lift body mounted in a fixed or defined position relative to the rotation element pushes the leading edge portion of the upper skin panel downwards, too. When the rotation element rotates upwards to move the high lift body back into the stowed position, the elastic properties of the upper skin panel move the leading edge portion of the upper skin panel back upwards into the undeformed state. The trailing edge of the high lift body preferably has a defined stiffness to achieve the desired deformation of the leading edge portion of the upper skin panel. By the trailing edge of the high lift body deforming the leading edge portion of the upper skin panel the curvature of the leading edge portion of the upper skin panel can be precisely adapted to form the desired pressure profile in a very simple manner.

According to a preferred embodiment, the wing comprises a rotating actuator for driving the rotation element about the axis of rotation. Such a rotating actuator is a simple and effective way to drive the high lift body.

In particular, it is preferred that the rotary actuator is mounted, preferably fixedly mounted, to the main wing and has a rotating drive arm linked to the rotation element by a drive link that is, preferably at one end, rotatably mounted to the drive arm and that is, preferably at the other end, rotatably mounted to the rotation element. This results in a simple and effective actuator.

Alternatively, it is preferred that the rotary actuator comprises a first rotating arm and a second rotating arm rotating in opposite directions about a common axis. The first rotating arm is rotatably mounted to the main wing, and the second rotating arm is rotatably mounted to the rotation element or to the high lift body. In such a way, the common axis is displaced when the actuator is actuated. This results in a simple and effective actuator.

According to a preferred embodiment, at least one stiffener is provided at the leading edge portion of the upper skin panel. The stiffener extends in a span direction, preferably in parallel to the axis of rotation and/or in parallel to the trailing edge of the high lift body. By such a spanwise stiffener deflection of the leading edge portion of the upper skin panel in the span direction can be reduced, in particular between different rotation elements or different connection assemblies in the span direction, if present.

In particular, it is preferred that the stiffener is formed separately from the upper skin panel and is attached to an inner surface of the leading edge portion of the upper skin panel. Preferably, the stiffener has an angled profile including a flange element resting against the inner surface of the leading edge portion of the upper skin panel, and a web element extending angled to the flange element and away from the inner surface of the leading edge portion of the upper skin panel. Such an angled profile might be an L-, C-, T-, Z-, or I-profile. Such a stiffener is lightweight, simple to install, and provides an effective stiffening.

Alternatively, it is preferred that the stiffener is formed integral with the leading edge portion of the upper skin panel. For example, the stiffener might be formed by bending a part of the leading edge portion of the upper skin panel made of a metal material, or might be molded as part of the leading edge portion of the upper skin panel made of a fiber reinforced plastic material. Such an integral stiffener provides a simple form and requires no extra parts.

It is also preferred that the link element and/or the rope element is attached to the leading edge portion of the upper skin panel via the stiffener or in the area of the stiffener. By the attachment to the stiffener with a defined stiffness a defined contact or gap between the trailing edge of the high lift body and the outer surface of the leading edge portion of the upper skin panel can be precisely adjusted as desired. Alternatively, the link element might also be attached to the link element and/or the rope element in a position spaced from the attachment or from the area of the stiffener.

It is further preferred that the extension of the stiffener normal to the leading edge portion of the upper skin panel varies in the span direction. In such a way, the stiffness of the stiffener can be adapted as required in the span direction.

In particular, it is preferred that the extension of the stiffener normal to the leading edge portion of the upper skin panel varies in the span direction in such a way that a maximum extension is in the area of the attachment of the link element and/or the rope element, while the extension is decreasing, preferably linearly decreasing, in the span direction with increasing distance from the area of the attachment of the link element and/or the rope element. Likewise, a minimum extension is located between, preferably centrally between, the link elements or rope elements of each two spanwise neighboring connection assemblies or rotation elements. In such a way, the stiffness of the stiffeners is distributed in the span direction such that the highest stiffness is present in the attachment area of the link element or rope element.

According to a further preferred embodiment, the leading edge portion of the upper skin panel has a thickness varying in a chord direction, to adapt the curvature of the leading edge portion of the upper skin panel when in the deformed state. In such a way, the thickness of the leading edge portion of the upper skin panel can be used to tailor the curvature of the upper skin panel in the deformed state, i.e., when the high lift body is in the deployed position. Preferably, the thickness of the leading edge portion of the upper skin panel varies analogue to the bending moment resulting from elastic deformation of the leading edge portion of the upper skin panel, preferably in such a way that the varying bending stiffness along the chord direction of the leading edge portion of the upper skin panel, resulting from the varying thickness, compensates the bending moment.

In particular, it is preferred that the thickness of the leading edge portion of the upper skin panel increases linearly or essentially linearly in the chord direction downstream, preferably from the leading edge downstream. In such a way, the bending stiffness of the leading edge portion of the upper skin panel in the chord direction can be adapted to compensate the bending moment resulting from elastic deformation of the leading edge portion of the upper skin panel.

Additionally or alternatively, it is preferred that the leading edge portion of the upper skin panel is made of a fiber reinforced plastic having a varying laminate lay-up in the chord direction, to adapt the curvature of the leading edge portion of the upper skin panel when in the deformed state. In such a way, the laminate lay-up of the leading edge portion of the upper skin panel can be used to tailor the curvature of the upper skin panel in the deformed state, i.e., when the high lift body is in the deployed position. Preferably, the laminate lay-up of the leading edge portion of the upper skin panel varies analogue to the bending moment resulting from elastic deformation of the leading edge portion of the upper skin panel, preferably in such a way that the varying bending stiffness along the chord direction of the leading edge portion of the upper skin panel, resulting from the varying laminate lay-up, compensates the bending moment. Preferably, the laminate lay-up of the leading edge portion of the upper skin panel increases linearly in the chord direction downstream, preferably from the leading edge downstream.

Additionally or alternatively, it is preferred that the leading edge portion of the upper skin panel is provided with at least one reinforcement element, preferably attached to the inner surface of the upper skin panel, extending in the chord direction to vary the bending stiffness of the leading edge portion of the upper skin panel along the chord direction, to adapt the curvature of the leading edge portion of the upper skin panel when in the deformed state. The reinforcement element might itself have a bending stiffness constant or varying in the chord direction. In such a way, the reinforcement element can be used to tailor the curvature of the upper skin panel in the deformed state, i.e., when the high lift body is in the deployed position. Preferably, the reinforcement element is configured such that the bending stiffness of the leading edge portion of the upper skin panel varies in the chord direction analogue to the bending moment resulting from elastic deformation of the leading edge portion of the upper skin panel, in order to compensate the bending moment. Preferably, the reinforcement element is configured such that the bending stiffness of the leading edge portion of the upper skin panel increases linearly in the chord direction downstream, preferably from the leading edge downstream.

According to a further preferred embodiment, the leading edge high lift assembly comprises a further connection assembly spaced from the connection assembly in the span direction and preferably formed as the connection assembly. Preferably at least two spaced connection assemblies are provided to carry each high lift body. Each connection assembly might also comprise more than one rotation element. In such a way, a stable hold and movement of the high lift body is achieved.

A further aspect of the invention relates to a leading edge high lift assembly for the wing according to any of the afore-described embodiments. The leading edge high lift assembly comprises a high lift body and a connection assembly for connecting the high lift body to a main wing in such a way that the high lift body is movable relative to the main wing between a stowed position and a deployed position. The connection assembly comprises a rotation element that is mounted to the high lift body and that is configured to be mounted to the main wing rotatably about an axis of rotation. The high lift body extends between a leading edge and a trailing edge, wherein in an installed state the trailing edge of the high lift body is configured to move along the leading edge portion of an upper skin panel of the main wing, when the high lift body is moved between the stowed position and the deployed position. The leading edge high lift assembly is configured such that in an installed state the leading edge portion of the upper skin panel can be elastically deformed, when the high lift body is moved from the stowed position to the deployed position Features and effects described above in connection with the wing apply vis-a-vis also to the leading edge high lift assembly.

A further aspect of the invention relates to an aircraft comprising the wing according to any of the afore-described embodiments and/or comprising the leading edge high lift assembly according to any of the afore described embodiments. Features and effects described above in connection with the wing and in connection with the leading edge high lift assembly apply vis-a-vis also to the aircraft.

BRIEF DESCRIPTION OF THE DRAWINGS

Preferred embodiments of the present invention are explained hereinafter in more detail by means of a drawing.

DETAILED DESCRIPTION OF THE PREFERRED EMBODIMENTS

Figure 1:
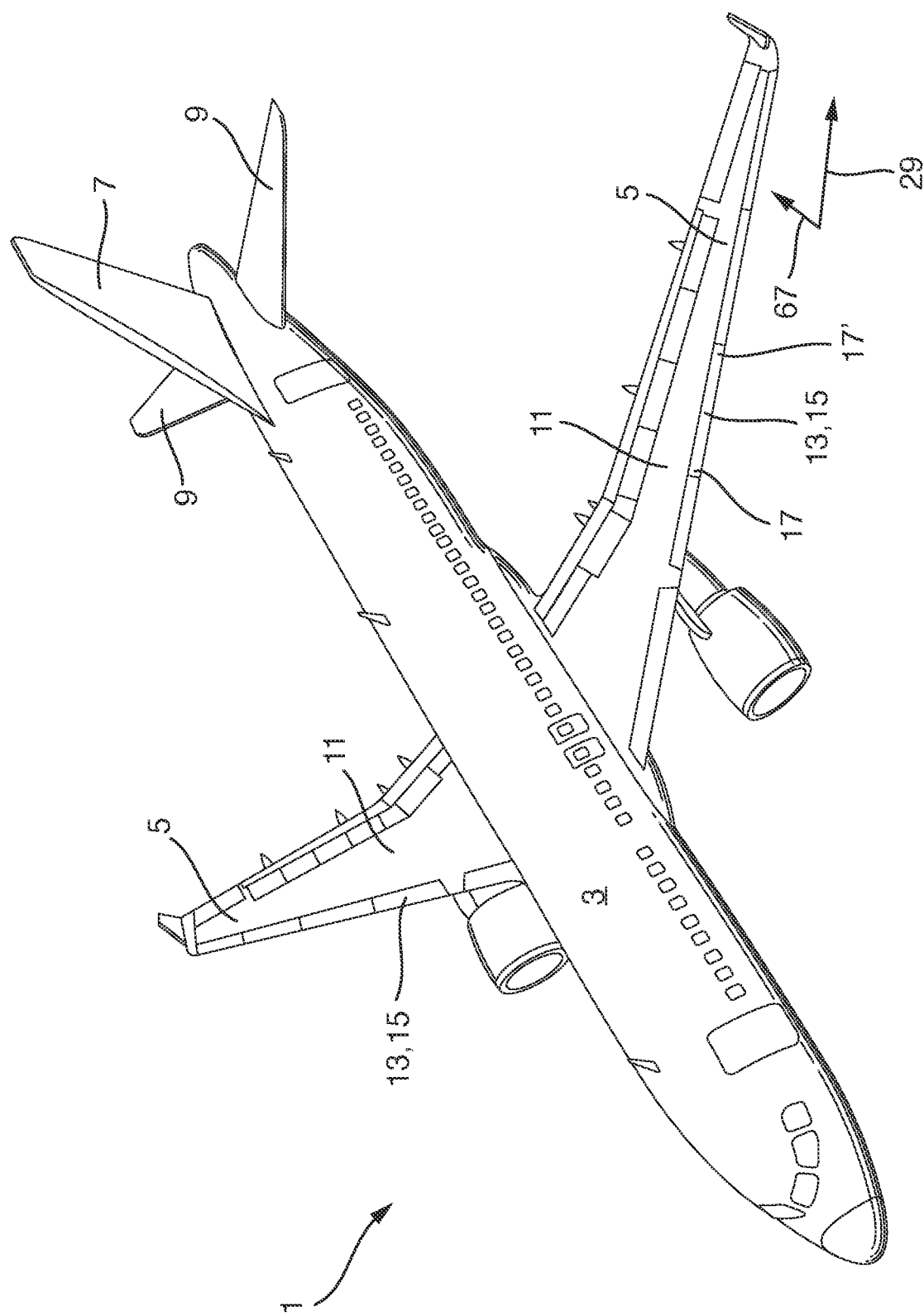
FIG. 1 shows a perspective view of an aircraft according to the invention.

In FIG. 1, an embodiment of an aircraft 1 according to the present invention is illustrated. The aircraft 1 comprises a fuselage 3, wings 5, a vertical tail plane 7 and a horizontal tail plane 9. FIGS. 2 to 9 show in more detail several embodiments of the wings 5.

Figure 2:
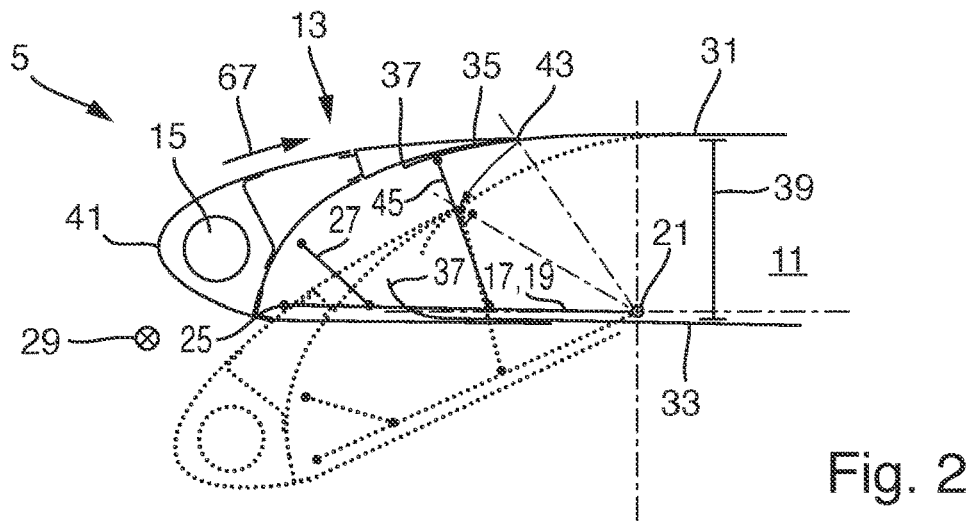
FIG. 2 shows a schematic cross-sectional view across the span direction of a wing according to a first embodiment of the invention.

FIG. 2 shows a first embodiment of the wing 5 according to the invention. The wing 5 comprises a main wing 11 and a leading edge high lift assembly 13 movable relative to the main wing 11 to increase lift of the wing 5. The leading edge high lift assembly 13 comprises a high lift body 15 and a connection assembly 17. The high lift body 15 is a droop high lift body, also referred to as droop nose, droop leading edge, droop flap or slat, in particular, a sealed slat. The connection assembly 17 is configured for connecting the high lift body 15 to the leading edge of the main wing 11 in such a way that the high lift body 15 is movable relative to the main wing 11 between a stowed position and a deployed position. The stowed position relates to a position where the wing profile has a lower curvature, while the deployed position relates to a position where the wing profile has a higher curvature.

The connection assembly 17 comprises at least one rotation element 19 that is mounted to the high lift body 15 and that is mounted to the main wing 11 rotatably about an axis of rotation 21. The rotation element 19 is mounted to the high lift body 15 in a fixed, non-rotatable manner by a hinge 25 arranged between the end of the rotation element 19 and the high lift body 15, and additionally by a fixing link 27 that is hinged to the rotation element 19 and that is hinged to the high lift body 15 spaced apart from the rotation element 19, so that a relative rotation of the high lift body 15 and the rotation element 19 is prevented. The axis of rotation 21 is arranged at a lower part of the main wing 11 near or at a lower skin and preferably extends in parallel to a span direction 29 and in parallel to the extension of leading edge along the wing 5, so that the high lift body 15 is rotated about the axis of rotation 21 when moved between the stowed position and the deployed position.

The main wing 11 comprises an upper skin panel 31 for contact with an ambient flow on an upper side of the main wing 11, and a lower skin panel 33 for contact with an ambient flow on a lower side of the main wing 11. The upper skin panel 31 has a leading edge portion 35 in the area of a leading edge of the main wing 11 and facing the high lift body 15. The upper skin panel 31 and the lower skin panel 33 have an open end 37 at the leading edge of the main wing 11, where they are connected or supported against each other via a front spar 39.

The high lift body 15 extends between a leading edge 41 and a trailing edge 43, the trailing edge 43 being parallel to the axis of rotation 21. The trailing edge 43 of the high lift body 15 moves in a sliding manner along the outer surface of the leading edge portion 35 of the upper skin panel 31 of the main wing 11 in contact with the outer surface of the leading edge portion 35 of the upper skin panel 31, when the high lift body 15 is moved between the stowed position and the deployed position. The contact generally seals the high lift body 15 to the upper skin panel 31 for essential flow, but a certain leakage flow might be permitted.

The leading edge portion 35 of the upper skin panel 31 is configured to be elastically deformed in such a way that it is bent towards the lower skin panel 33, when the high lift body 15 is moved from the stowed position to the deployed position. The elastic deformation can be done in different ways according to the invention, as described hereinafter.

In the embodiment shown in FIG. 2, the leading edge portion 35 of the upper skin panel 31 is configured to be elastically deformed, when the high lift body 15 is moved from the stowed position to the deployed position, by a link element 45 that is rotatably mounted at one end to the rotation element 19 and that is at the other end rotatably mounted to the leading edge portion 35 of the upper skin panel 31. When the rotation element 19 rotates downwards to move the high lift body 15 into the deployed position, the link element 45 mounted to the rotation element 19 pulls the leading edge portion 35 of the upper skin panel 31 downwards, too. When the rotation element 19 rotates upwards to move the high lift body 15 back into the stowed position, the link element 45 pushes the leading edge portion 35 of the upper skin panel 31 back upwards into the undeformed state. As an alternative to the link element 45, a rope element (not shown) can be used to deform the leading edge portion 35 of the upper skin element 31. Additional to the deformation caused by the link element 45, in the embodiment of FIG. 2 the leading edge portion 35 of the upper skin panel 31 is configured to be elastically deformed by the trailing edge 43 of the high lift body 15 moving along in a sliding manner and continuously contacting and pressing onto an outer surface of the leading edge portion 35 of the upper skin panel 31, when the high lift body 15 is moved from the stowed position to the deployed position. When the rotation element 19 rotates downwards to move the high lift body 15 into the deployed position, the trailing edge 43 of the high lift body 15 mounted in a fixed or defined position relative to the rotation element 19 pushes the leading edge portion 35 of the upper skin panel 31 downwards, too. When the rotation element 19 rotates upwards to move the high lift body 15 back into the stowed position, the elastic properties of the upper skin panel 31 assist to move the leading edge portion 35 of the upper skin panel 31 back upwards into the undeformed state. In such a way, by the link element 45 together with the trailing edge 43 of the high lift body 15 the curvature of the leading edge portion 35 of the upper skin panel 31 can be precisely adapted to form the desired pressure profile.

Figure 3A:
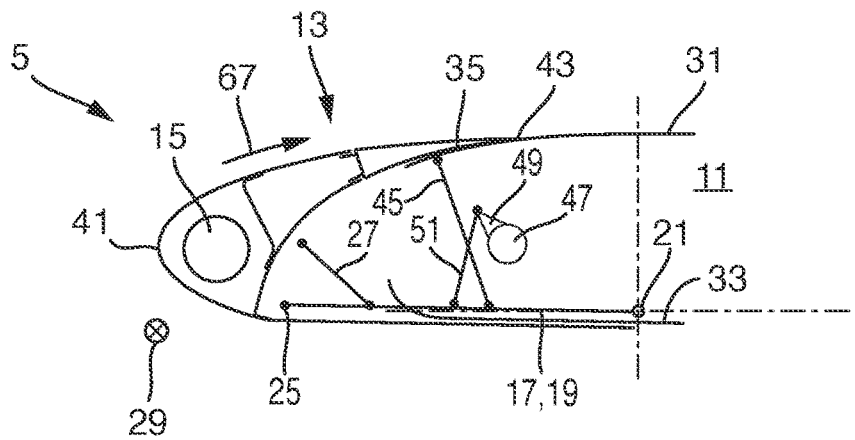
FIGS. 3a and 3b show a schematic cross-sectional view across the span direction of a wing according to a second embodiment of the invention.
Figure 3B:
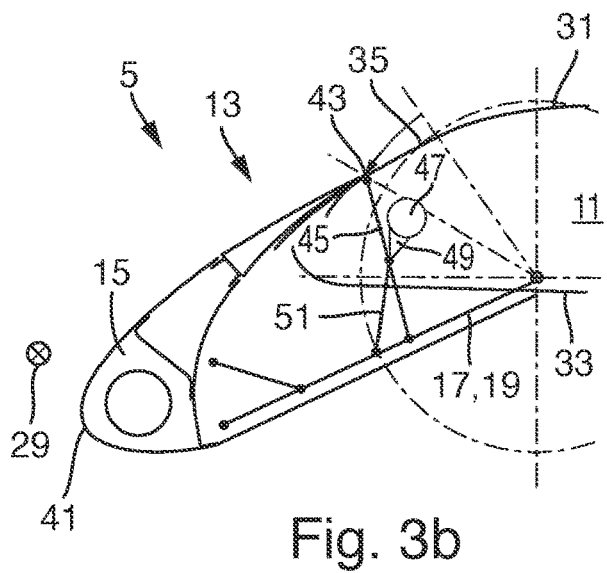
Figure 4:
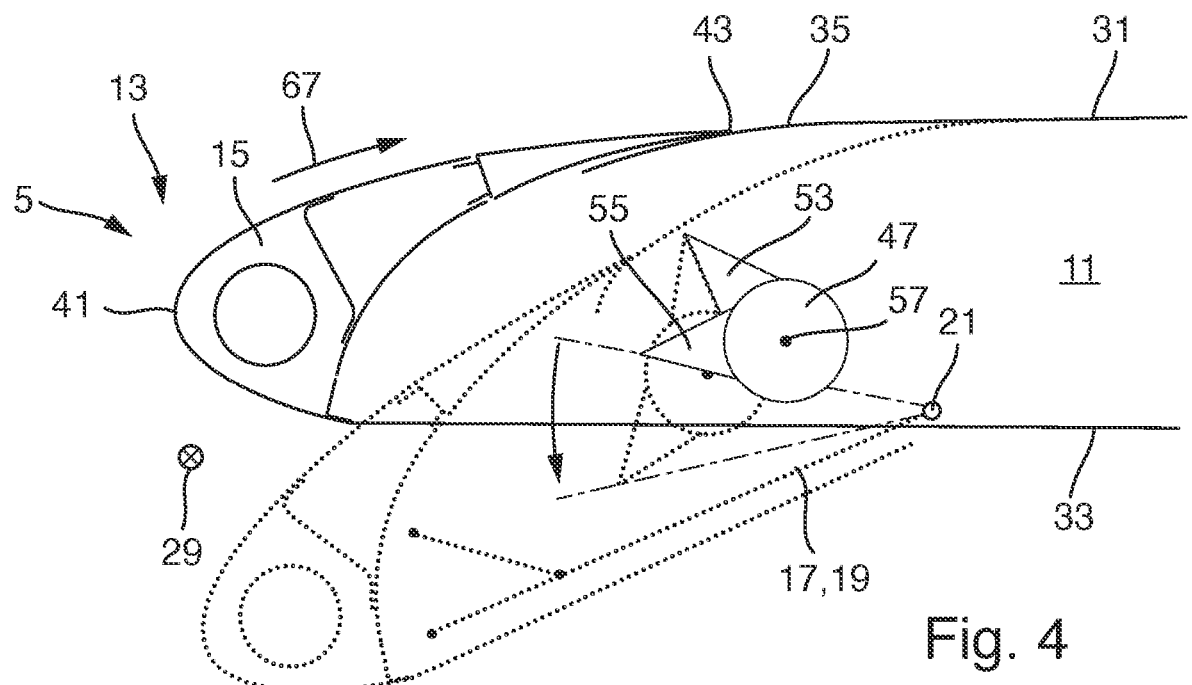
FIG. 4 shows a schematic cross-sectional view across the span direction of a wing according to a third embodiment of the invention.

The embodiments shown in FIGS. 3 and 4 differ from the embodiment shown in FIG. 2 by the wing 5 comprising a rotating actuator 47 for driving the rotation element 19 about the axis of rotation 21. In the embodiment shown in FIG. 3, the rotary actuator 47 is fixedly mounted to the main wing 11 and has a rotating drive arm 49 linked to the rotation element 19 by a drive link 51 that is at one end rotatably mounted to the drive arm 49 and that is at the other end rotatably mounted to the rotation element 19. FIG. 3a shows the high lift body 15 in the stowed position, while FIG. 3b shows the high lift body 15 in the deployed position.

In the alternative embodiment shown in FIG. 4, the rotary actuator 47 comprises a first rotating arm 53 and a second rotating arm 55 rotating in opposite directions about a common axis 57. The first rotating arm 53 is rotatably mounted to the main wing 11, and the second rotating arm 55 is rotatably mounted to the rotation element 19 or to the high lift body 15, so that the common axis 57 is displaced when the actuator 47 is actuated.

Figure 5:
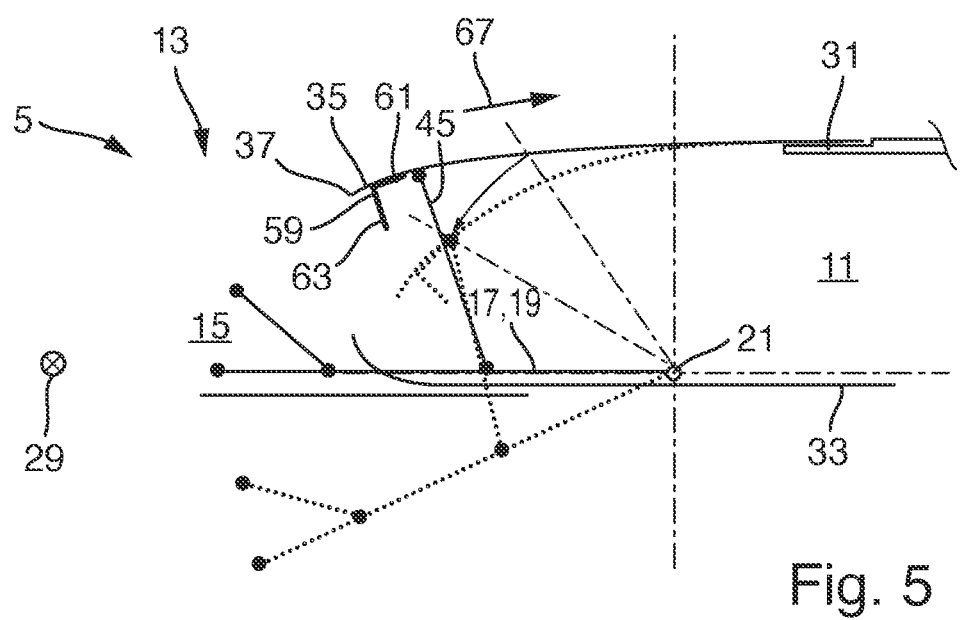
FIG. 5 shows a schematic cross-sectional view of across the span direction a wing according to a fourth embodiment of the invention.
Figure 6:
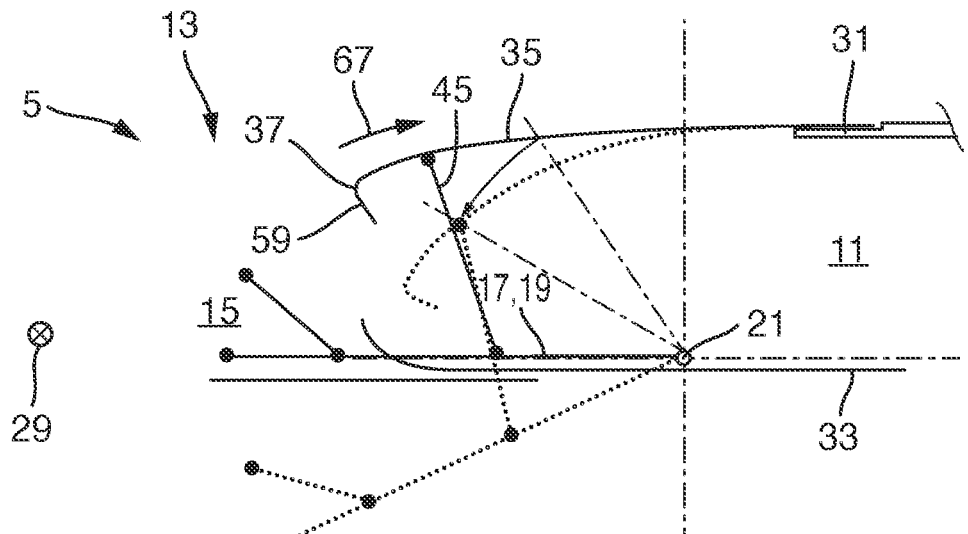
FIG. 6 shows a schematic cross-sectional view across the span direction of a wing according to a fifth embodiment of the invention.
Figure 7:
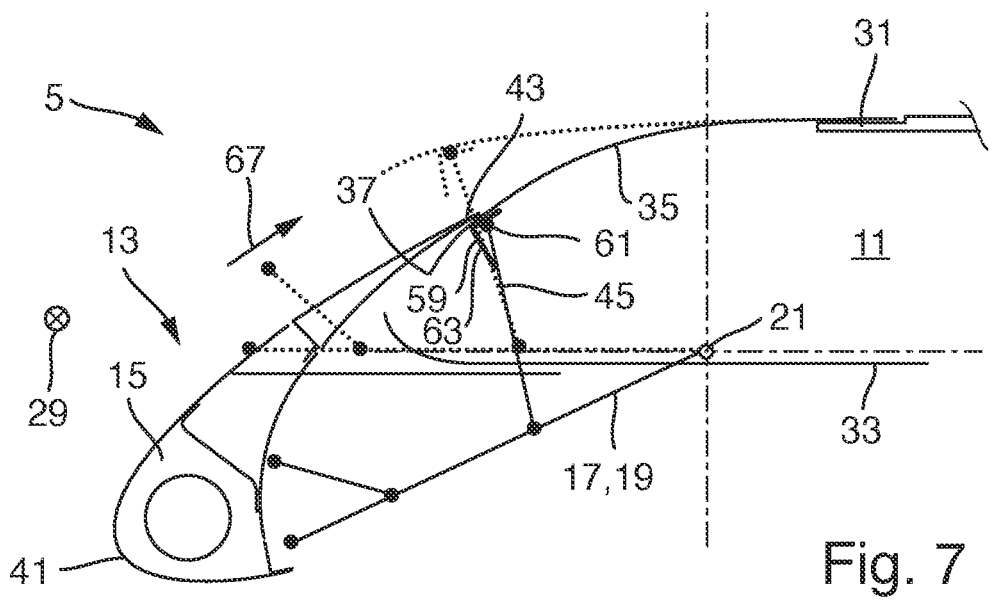
FIG. 7 shows a schematic cross-sectional view across the span direction of a wing according to a sixth embodiment of the invention.

The embodiments shown in FIGS. 5 to 7 differ from the embodiment shown in FIG. 2 by a stiffener 59 being provided at the leading edge portion 35 of the upper skin panel 31. The stiffener 59 extends in a span direction 29 in parallel to the axis of rotation 21 and in parallel to the trailing edge 43 of the high lift body 15.

In the embodiments shown in FIGS. 5 and 7, the stiffener 59 is formed separately from the upper skin panel 31 and is attached to an inner surface of the leading edge portion 35 of the upper skin panel 31. The stiffener 59 has an angled profile including a flange element 61 resting against the inner surface of the leading edge portion 35 of the upper skin panel 31, and a web element 63 extending angled to the flange element 61 and away from the inner surface of the leading edge portion 35 of the upper skin panel 31. The angle profile in the present embodiment is an L-profile.

In the alternative embodiment shown in FIG. 6, the stiffener 59 is formed integral with the leading edge portion 35 of the upper skin panel 31. In case of the upper skin panel 31 being made of a metal material the stiffener 59 is formed by bending a part of the leading edge portion 35 of the upper skin panel 31. In case of the upper skin panel 31 being made of a fiber reinforced plastic material, the stiffener 59 is molded as part of the leading edge portion 35 of the upper skin panel 31.

Figure 8:
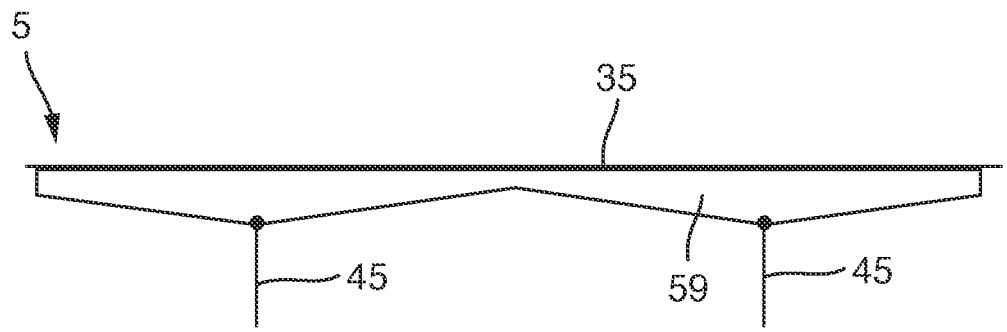
FIG. 8 shows a schematic cross-sectional view across the chord direction of the wing shown in FIG. 7.

In the embodiment shown in FIG. 7, the link element 45 is attached to the leading edge portion 35 of the upper skin panel 31 via the stiffener 59. As shown in FIG. 8, the extension of the stiffener 59 normal to the leading edge portion 35 of the upper skin panel 31 varies in the span direction 29 in such a way that a maximum extension is in the area of the attachment of the link element 45, while the extension is linearly decreasing in the span direction 29 with increasing distance from the area of the attachment of the link element 45. Likewise, a minimum extension is located centrally between the link elements 45 of each two spanwise neighboring connection assemblies 17.

Figure 9:
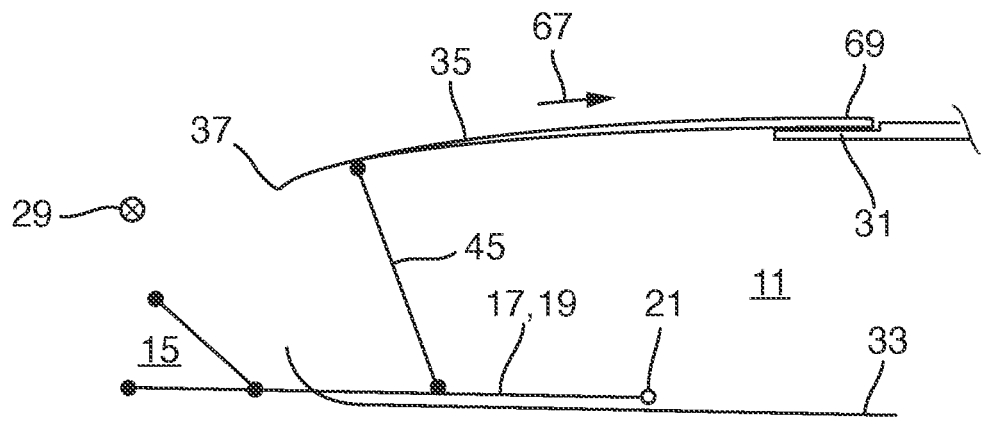
FIG. 9 shows a schematic cross-sectional view across the span direction of a wing according to a seventh embodiment of the invention.

The embodiment shown in FIG. 9 differs from the embodiment shown in FIG. 2 by the leading edge portion 35 of the upper skin panel 31 having a thickness varying in a chord direction 67, to adjust the curvature of the leading edge portion 35 of the upper skin panel 31 when in the deformed state. This allows the thickness of the leading edge portion 35 of the upper skin panel 31 to be used to tailor the curvature of the upper skin panel 31 in the deformed state, i.e., when the high lift body 15 is in the deployed position. The thickness of the leading edge portion 35 of the upper skin panel 31 varies analogue to the bending moment resulting from elastic deformation of the leading edge portion 35 of the upper skin panel 31, in such a way that the varying bending stiffness along the chord direction 67 of the leading edge portion 35 of the upper skin panel 31, resulting from the varying thickness, compensates the bending moment. This means in the present embodiment, the thickness of the leading edge portion 35 of the upper skin panel 31 increases linearly or essentially linearly in the chord direction 67 downstream, so that a maximum thickness is reached at the downstream end 69 of the leading edge portion 35 of the upper skin panel 31.

In case that the leading edge portion 35 of the upper skin panel 31 being made of a fiber reinforced plastic, the linear thickness increase of the upper skin panel 31 might be implemented or assisted by the leading edge portion 35 of the upper skin panel 31 having a linearly increasing, e.g., ply-ramped, laminate lay-up (not shown) in the chord direction 67. Also, one or more reinforcement elements (not shown) attached to the leading edge portion 35 of the upper skin panel 31 might be used to implement or assist an increasing bending stiffness of the leading edge portion 35 of the upper skin panel 31 in the chord direction to compensate an increasing bending moment.

As shown in FIG. 1, the leading edge high lift assembly 13 comprises a further connection assembly 17' spaced from the connection assembly 17 in the span direction 29 and preferably formed as the connection assembly 17. At least two spaced connection assemblies 17, 17' are provided to carry each high lift body 15. Each connection assembly 17, 17' might also comprise more than one rotation element 19.

By the invention as described above, a smooth transition from the trailing edge 43 of the high lift body 15 to the upper skin panel 31 can be achieved avoiding small and discontinuous curvature radii. This results in a smooth pressure profile along the upper skin panel 31 without undesired pressure peaks. While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising
a main wing, and
a leading edge high lift assembly comprising:
   a high lift body, and
   a connection assembly connecting the high lift body to the main wing in such a way that the high lift body is movable relative to the main wing between a stowed position and a deployed position,
wherein the connection assembly comprises at least one rotation element that is mounted to the high lift body and that is mounted to the main wing rotatably about an axis of rotation,
wherein the main wing comprises an upper skin panel having an outer surface for contact with an ambient flow on an upper side of the main wing and a lower skin panel, wherein the upper skin panel has a leading edge portion,
wherein the high lift body extends between a leading edge and a trailing edge,
wherein the trailing edge of the high lift body is configured to move along the outer surface of the leading edge portion of the upper skin panel of the main wing, when the high lift body is moved between the stowed position and the deployed position,
wherein the leading edge portion of the upper skin panel is configured to be elastically deformed when the high lift body is moved from the stowed position to the deployed position,
wherein the leading edge portion of the upper skin panel is configured to be elastically deformed, when the high lift body is moved from the stowed position to the deployed position, by at least one link element rotatably mounted to the rotation element and rotatably mounted to the leading edge portion of the upper skin panel between the trailing edge of the high light body and a leading edge of the main wing.

2. The wing according to claim 1, wherein the leading edge portion of the upper skin panel is configured to be elastically deformed by the trailing edge of the high lift body moving along and contacting the leading edge portion of the upper skin panel, when the high lift body is moved from the stowed position to the deployed position.

3. The wing according to claim 1, wherein the wing comprises a rotary actuator for driving the rotation element about the axis of rotation.

4. The wing according to claim 3, wherein the rotary actuator is mounted to the main wing and has a rotating drive arm linked to the rotation element by a drive link that is rotatably mounted to the drive arm and that is rotatably mounted to the rotation element.

5. The wing according to claim 3,
wherein the rotary actuator comprises a first rotating arm and a second rotating arm rotating in opposite directions about a common axis,
wherein the first rotating arm is rotatably mounted to the main wing, and
wherein the second rotating arm is rotatably mounted to the rotation element or to the high lift body.

6. The wing according to claim 1,
wherein at least one stiffener is provided at the leading edge portion of the upper skin panel,
wherein the stiffener extends in a span direction.

7. The wing according to claim 6, wherein the stiffener is formed separately from the upper skin panel and is attached to an inner surface of the leading edge portion of the upper skin panel.

8. The wing according to claim 6, wherein the stiffener is formed integral with the leading edge portion of the upper skin panel.

9. The wing according to claim 1,
wherein at least one stiffener is provided at the leading edge portion of the upper skin panel,
wherein the stiffener extends in a span direction, and
wherein at least one of the link element or the rope element is attached to the leading edge portion of the upper skin panel via the stiffener.

10. The wing according to claim 6, wherein an extension of the stiffener normal to the upper skin panel varies in the span direction.

11. The wing according to claim 1,
wherein at least one stiffener is provided at the leading edge portion of the upper skin panel,
wherein the stiffener extends in a span direction,
wherein an extension of the stiffener normal to the upper skin panel varies in the span direction, and
wherein the extension of the stiffener normal to the upper skin panel varies in the span direction in such a way that a maximum extension is in an area of an attachment of at least one of the link element or the rope element, while the extension is decreasing in the span direction with increasing distance from the area of the attachment of at least one of the link element or the rope element.

12. The wing according to claim 1, wherein the leading edge portion of the upper skin panel has a thickness varying in a chord direction.

13. The wing according to claim 12, wherein the thickness of the leading edge portion of the upper skin panel increases linearly in the chord direction downstream.

14. The wing according to claim 1, wherein the leading edge portion of the upper skin panel is made of a fiber reinforced plastic having a varying laminate lay-up in a chord direction.

15. The wing according to claim 1, wherein the leading edge portion of the upper skin panel is provided with at least one reinforcement element extending in a chord direction to vary a bending stiffness of the leading edge portion of the upper skin panel along the chord direction.

16. The wing according to claim 1, wherein the leading edge high lift assembly comprises a further connection assembly spaced from the connection assembly in a span direction.

17. An aircraft comprising the wing according to claim 1.

* * * * *